Sept. 6, 1949.  C. H. ZIMMERMAN  2,481,379
AIRCRAFT HAVING EXTENSIBLE LANDING GEAR POSITIONABLE
FOR HORIZONTAL AND VERTICAL TAKE-OFF
Filed July 26, 1945  8 Sheets-Sheet 1

INVENTOR.
Charles H. Zimmerman
BY
M. B. Tasker
ATTORNEY

Fig 2

Sept. 6, 1949.  C. H. ZIMMERMAN  2,481,379
AIRCRAFT HAVING EXTENSIBLE LANDING GEAR POSITIONABLE
FOR HORIZONTAL AND VERTICAL TAKE-OFF
Filed July 26, 1945  8 Sheets-Sheet 4

INVENTOR.
Charles H. Zimmerman
BY
M. B. Tasker
ATTORNEY

Sept. 6, 1949.  C. H. ZIMMERMAN  2,481,379
AIRCRAFT HAVING EXTENSIBLE LANDING GEAR POSITIONABLE
FOR HORIZONTAL AND VERTICAL TAKE-OFF
Filed July 26, 1945  8 Sheets-Sheet 5

INVENTOR.
Charles H. Zimmerman
BY
M. B. Tasker
ATTORNEY

Sept. 6, 1949.  C. H. ZIMMERMAN  2,481,379
AIRCRAFT HAVING EXTENSIBLE LANDING GEAR POSITIONABLE
FOR HORIZONTAL AND VERTICAL TAKE-OFF
Filed July 26, 1945  8 Sheets-Sheet 6

INVENTOR.
Charles H. Zimmerman
BY
M. B. Tasker
ATTORNEY

INVENTOR.
Charles H. Zimmerman
BY
M. B. Tasker
ATTORNEY

Patented Sept. 6, 1949

2,481,379

UNITED STATES PATENT OFFICE 2,481,379

AIRCRAFT HAVING EXTENSIBLE LANDING GEAR POSITIONABLE FOR HORIZONTAL AND VERTICAL TAKE-OFF

Charles H. Zimmerman, Nichols, Conn.

Application July 26, 1945, Serial No. 607,168

16 Claims. (Cl. 244—7)

This invention relates to low aspect ratio, all-wing aircraft of the type disclosed in my U. S. Patent No. 2,108,093 and has for one of its objects to increase the utility of such aircraft by providing a mechanism which will fully realize those characteristics of a low aspect ratio, all-wing aircraft which permit landing and take-off without ground run.

More specifically, it is an object of this invention to provide a novel multi-position landing gear and trailing edge flap combination for use on low aspect ratio, all-wing aircraft.

Another object of the invention is to provide such a landing gear, trailing-edge-flap combination as will allow a low aspect ratio, all-wing aircraft to possess all the advantages of a helicopter.

A still further object of the invention is to provide not only for take-off and landing of an aircraft of this general type without ground run, but also to provide for retaining in such aircraft the ability for take-off and landing with ground run in conventional airplane fashion when excessive loading or impaired power makes such a procedure desirable.

A still more specific object of the invention is to provide a landing gear for use in all-wing aircraft for conventional airplane take-off and landing which may be telescopically extended for take-off or landing helicopter fashion and which may be fully retracted while the craft is in flight, and to provide a trailing edge flap which will enable the aircraft to be held in longitudinal trim regardless of its distance from the ground.

A further object is generally to improve the construction and performance of all-wing aircraft.

These and other objects and advantages of the invention will be apparent from the drawings and from the following description.

In the accompanying drawings, wherein like reference numerals designate similar parts throughout, there is illustrated a suitable mechanical embodiment for the purpose of disclosing the invention. The drawings, however, are for the purpose of illustration only and are not to be construed as limiting or restricting the invention, since it will be apparent to those skilled in the art that many changes in the detailed design of the illustrated embodiment may be resorted to without exceeding the scope of the invention as defined in the claims appended hereto.

Figure 1:
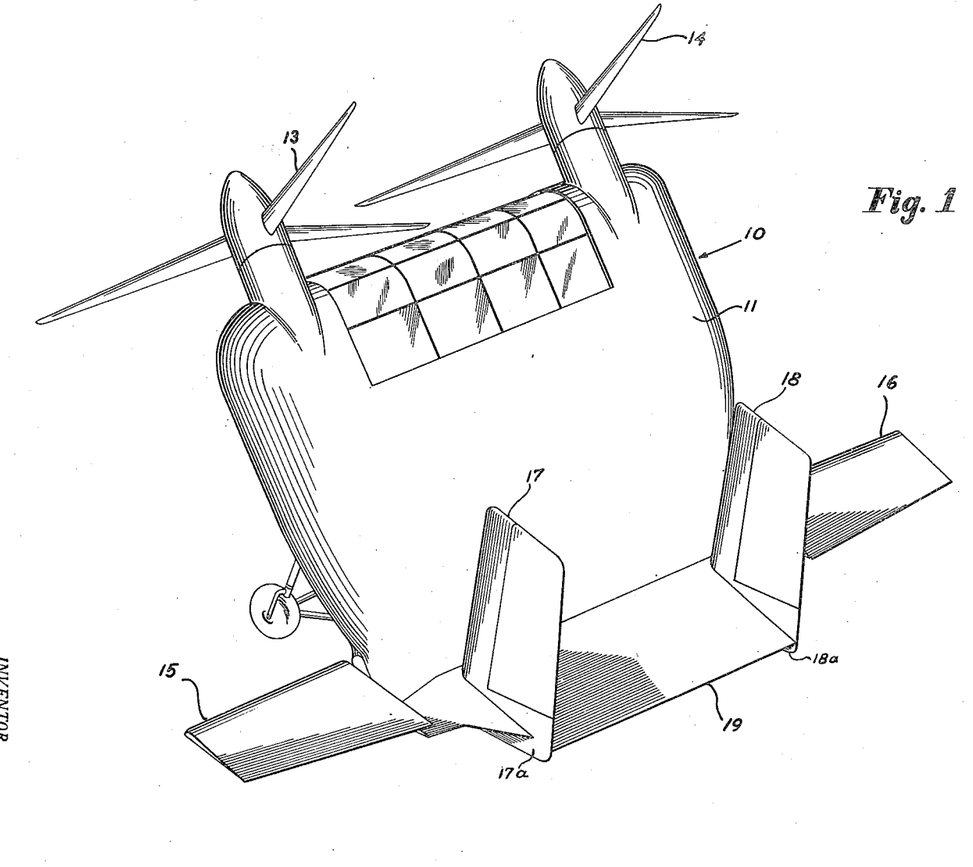
Fig. 1 is a rear perspective view of an aircraft embodying the invention.

Fig. 1 illustrates generally the type of aircraft in which the invention is preferably embodied. Numeral 10 indicates the craft as a whole which has a streamlined body 11 comprising the fuselage and wing structure which encloses and supports the passengers and the power plant as well as any other load. The craft has one or more propellers so disposed and of sufficient diameter so that substantially all of the aircraft lies within the propeller slipstream. In the preferred embodiment the aircraft is provided with two propellers 13 and 14 slightly forward of the leading edge of the wing adjacent the lateral extremities thereof geared together to turn in opposite directions and at the same speed. The propellers are of the controllable pitch type having constant speed governors associated therewith. The power plant may consist of one or more engines but must provide sufficient power to enable the propellers to produce a static thrust in excess of the weight of the aircraft. The craft preferably has laterally extending rearwardly disposed unit horizontal tail surfaces 15 and 16 and two vertical tail surfaces 17 and 18 which are disposed at the trailing edge of the body 11 and at the lateral extremities of a trailing edge flap 19 pivoted to the aircraft body at 19a, which is part of the invention and will be more fully described hereinafter. Herein the vertical surfaces 17 and 18 are mounted in fixed relation to the movable flap 19 so as to move therewith as the latter moves about its pivot 19a. In general the craft may be termed a low aspect ratio, flying wing helicopter having prone positioned pilot and passenger installation.

Figure 2:
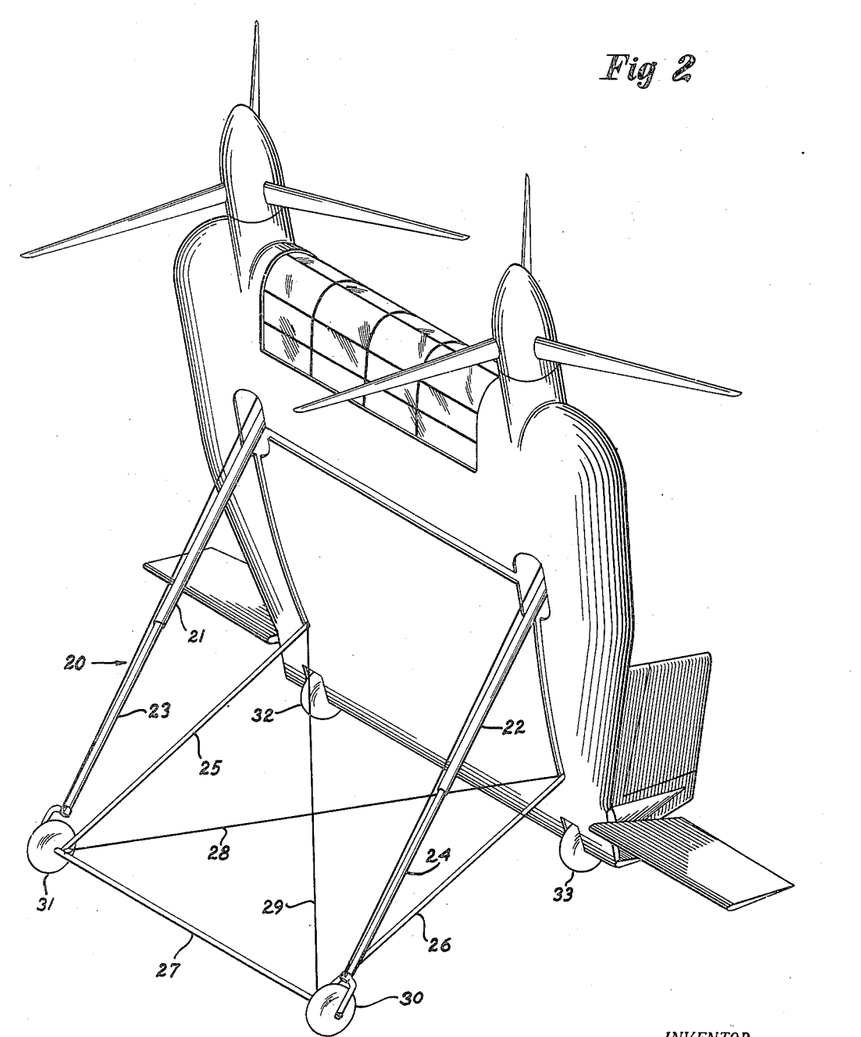
Fig. 2 is a front perspective view of the aircraft of Fig. 1.
Figure 13:
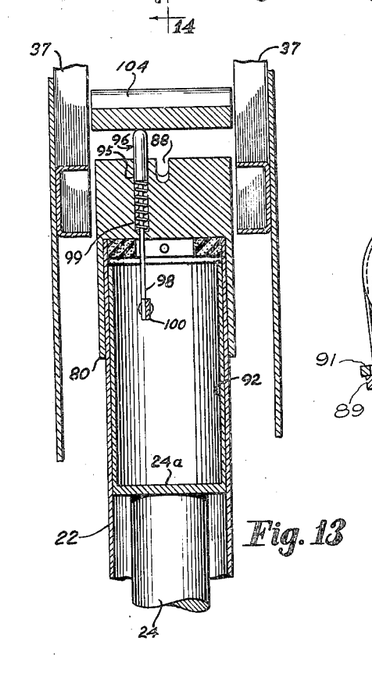
Fig. 13 is a section taken on line 13—13 of the Fig. 12.

Numeral 20 in Fig. 2 indicates generally the forward landing gear of the aircraft. The oleo struts are conventional self-contained shock absorbing units telescopically slidable within cylindrical casings 21 and 22. The oleo units are indicated at 23 and 24 in Fig. 2 in their fully extended positions. The oleos 23, 24 carry piston heads on their upper ends, one of which is shown at 24a in Figs. 13 and 14, which open at their upper ends into the casings 21, 22. The telescoping oleo struts 23, 24 and the casings 21, 22 of the landing gear differ from the usual landing gear, however, in that the oleos are adapted to occupy either of two positions relative to the casings in either of which the oleo struts cushion the landing of the craft in different flight attitudes of the latter, as will hereinafter be explained. Gear 20 has fixed length drag links 25 and 26, a rigid transverse brace 27 and diagonal cable type braces 28 and 29. Wheels 30 and 31 are mounted at the lower extremities of the oleos 23 and 24 in a conventional manner. Fixed tail wheels 32 and 33 are provided adjacent the lateral extremities of the trailing edge portion of body 11 independent of landing gear 20.

Figure 3:
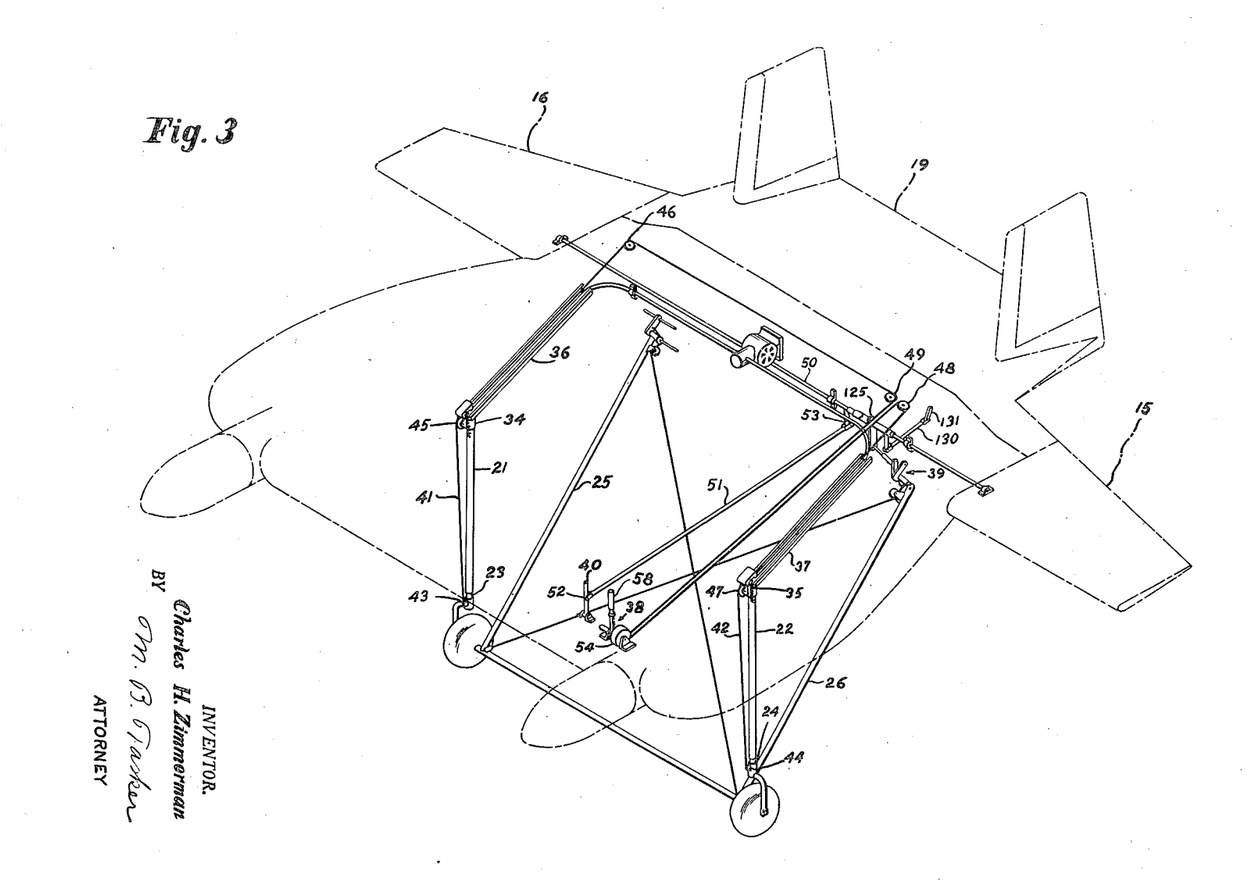
Fig. 3 is a plan perspective view of the aircraft in phantom, the landing gear being shown in full lines in position for "airplane" take-off.

As shown in Fig. 3 the upper ends of casings 21 and 22 are mounted at 34 and 35 at the forward ends of channel-type tracks 36 and 37 which are disposed generally longitudinally in the aircraft, but are inclined forwardly and downwardly with respect to the longitudinal axis of the aircraft and are fixedly mounted on the structure thereof. As further shown in Fig. 3, the system includes landing gear operating mechanism 38 and a linkage more fully described hereinafter, generally indicated at 39, for interconnecting the operating mechanism for the trailing edge flap 19, whenever the gear is in its most extended position, with a pilot operated control column 40 for operating the tail surfaces 15 and 16.

Cables 41 and 42 are provided for extending and retracting the gear, cable 41 having one end fixed at 43 to the base of oleo 23 and cable 42 having one end similarly fixed at 44 to oleo 24. Cable 41 is disposed to run through pulleys 45, 46 and 49 and cable 42 through pulleys 47 and 48, both cables having their ends fixed to cable drum 54 of mechanism 38 in such manner that they are wound and unwound in unison by opposite rotations of the drum. Control column 40 is connected to the horizontal tail surface control shaft 50 by link 51 which is pivotally mounted on control column 40 at 52 and at its opposite end is pivotally connected to arm 53 which depends from shaft 50, by which linkage the tail surfaces 15 and 16 are at all times controllable by the pilot from column 40.

Figures 6, 9, 10, 15:
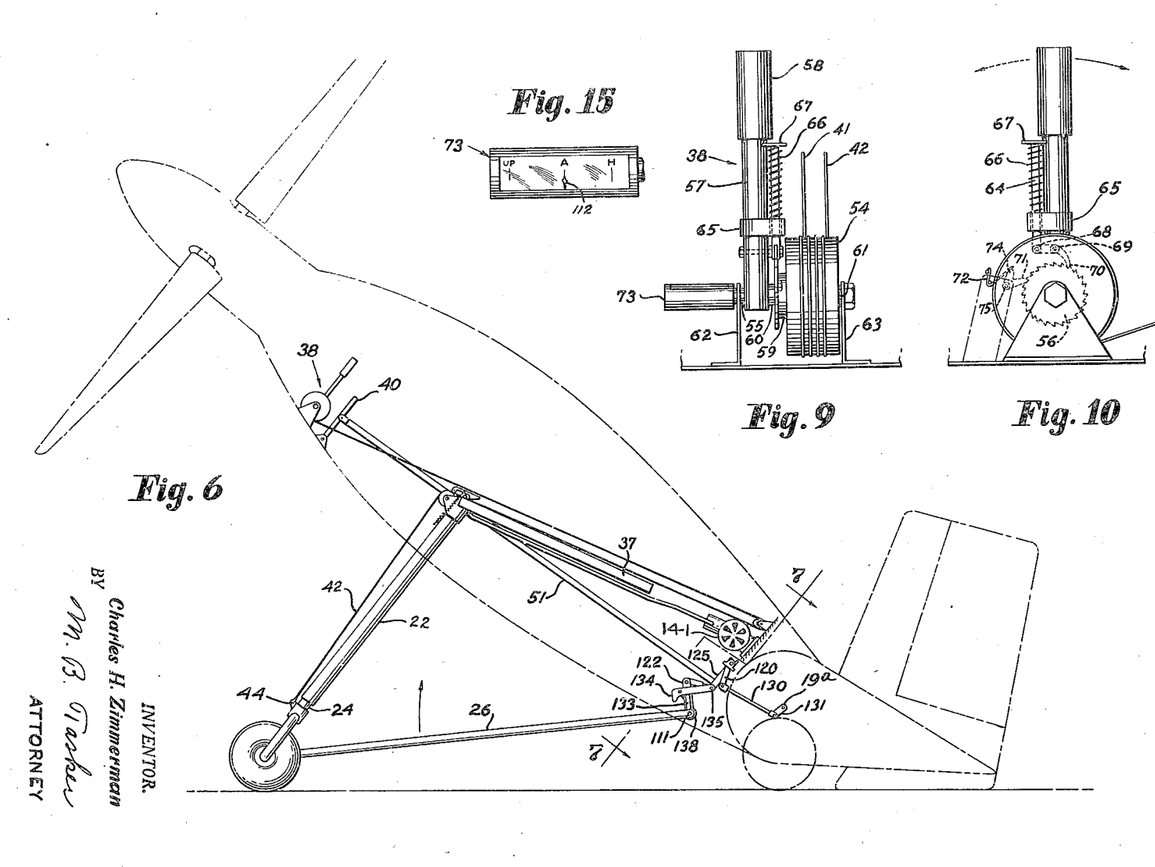
Fig. 6 is a phantom side elevation of the aircraft with the landing gear shown in position for "airplane" take-off.
Fig. 9 is a view of the landing gear actuating device looking aft as the device is installed in the aircraft.
Fig. 10 is a view of the actuating device looking inboard in the airplane.
Fig. 15 is a fragmentary plan view of Fig. 9 showing the indicator.

The landing gear operating mechanism is best shown in Figs. 9, 10 and 15 and consists of a cable drum ratchet mechanism. Cable drum 54 is mounted on shaft 55 in a freely rotatable manner and has mounted concentrically with it and fixed to it ratchet plate 56. Also mounted for free rotation on shaft 55 is a rod 57 the upper end of which carries handle grip 58. Rod 57 and cable drum 54 are retained in fixed relationship on shaft 55 by spacers 59, 60 and 61 and support members 62 and 63. Push rod 64 is mounted immediately adjacent and longitudinally parallel to rod 57, being constrained from any but longitudinal motion by guide 65 fixed to rod 57. Push rod 64 is spring biased in an upward direction by compression spring 66 mounted concentrically therewith and acting at its opposite ends against guide 65 and terminal cap 67 of rod 64. Pawl 68 is pivotally attached to the lower extremity of push rod 64 at right angles thereto and is also pivotally mounted on the lower end of rod 64 at 69. In its normal position the free extremity 70 of pawl 68 is engaged by some tooth of ratchet 56. Supported on structure adjacent to ratchet 56 is a second pawl 71 normally biased by spring 72 into engagement with the teeth of ratchet 56. Indicator 73 shown in plan view in Fig. 15 is mounted in any convenient manner to be actuated by operating mechanism 38 so as to indicate the position of the landing gear as being either in "up," "airplane" or "helicopter" position.

It will be apparent from the above that to wind cables 41 and 42 onto the cable drum it is only necessary to pull handle 58 in the direction of the full line arrow in Fig. 10, that is, aft in the airplane, thus imparting motion from the pawl 68 to the ratchet 56. This can be done in any convenient number of reciprocations of the handle 58 for it will be seen that pawl 71 will constrain the drum from releasing the cable. To release the cable drum, cap 67 of push rod 64 is depressed against the action of spring 66, thus causing the pawl 68 to rotate about point 69 thereby disengaging its extremity 70 from the teeth of ratchet 56. The handle 58 is then pushed in the direction of the dotted line arrow, i. e. forward in the airplane until the lowermost portion of push rod 64 engages tripping arm 74 of holding pawl 71 and causes it to rotate about its pivot 75 against the bias of spring 72. This movement of operating mechanism 38 through approximately 45° disengages pawl 71 from the teeth of ratchet plate 56 and leaves the drum free to rotate, thereby releasing cables 41 and 42.

Figure 11:
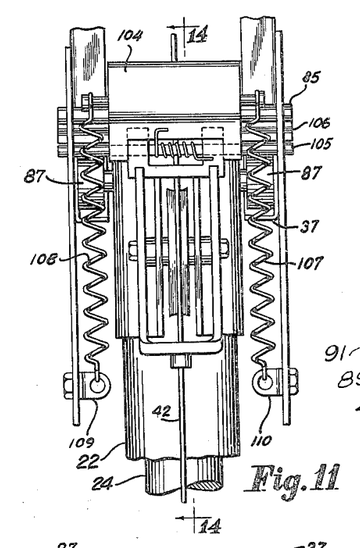
Fig. 11 is a view of the upper extremity of the landing gear looking aft as the device would be installed in the airplane.

As previously mentioned the uppermost extremities of casings 21 and 22 are mounted for sliding movement along sets of tracks 36 and 37 respectively, the upper ends of these casings being located at the forward ends of these tracks at points 34 and 35 in the position of the parts shown in Fig. 3. Since the mountings at these points are identical only one will be described in reference to Figs. 11, 12 and 14 wherein this mounting mechanism is best illustrated in connection with casing 22.

A cap 80 is fixedly attached to the upper portion of casing 22. In plan view cap 80 is generally annular except for a furcated portion 81 which protrudes from one side thereof and between the furcations of which pulley 47 is mounted on bolt 82. At its topmost extremity the cap 80 has a forwardly directed hook portion 84 which extends horizontally across it and which is disposed in such manner as to partially encircle a stop pin 85 which is fixed to aircraft structure adjacent and slightly above the forward end of track 37. At 90° to furcated portion 81 cap 80 has protruding from opposite sides thereof a stud 86 which carries at each of its ends a roller 87 positioned within one of the two confronting channel members which comprise the track 37, as shown most clearly in Fig. 13. As indicated at 88 cap 80 has an angular slot cut below and at right angles to hook 84 to permit cable 42 to pass therethrough without interference. Casing cap 80 is provided with a longitudinally drilled two-diameter hole 95 which contains a plunger 96 slidably mounted therein having an upper portion 97 of larger diameter than its lower portion 98. Plunger 96 is constantly biased upward by compression spring 99 acting at one end against the shoulder in hole 95 and at its other end against the lower extremity of portion 97. The lower end of plunger 96 is pivotally connected to the free end of lever 100 fulcrumed at 101 on the lower extremity of a depending support 102 which has its upper extremity fixed to casing cap 80. The free end of lever 100 is normally held by spring 99 in a slot 103 cut in the piston head wall 92 and is withdrawn from this slot only when plunger 96 is depressed.

A latch 104 is pivotally mounted at 105 on adjacent aircraft structure, this latch being limited in its downward motion when it is free by stop 106 and being biased constantly downward into latching engagement with hook portion 84 when the latter is abutting stop pin 85 by two strong springs 107 and 108 (Fig. 11) which have their upper ends fixed to latch 104 and their lower ends anchored to fixed aircraft structure at 109 and 110.

Figure 12:
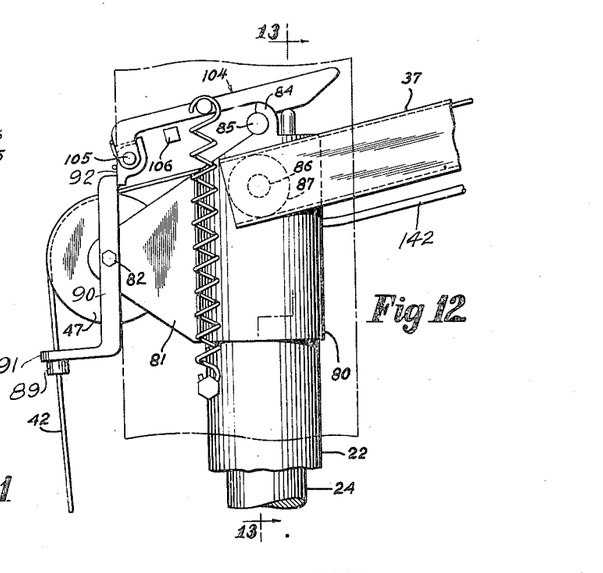
Fig. 12 is a view of the mechanism of Fig. 11 looking inboard in the airplane.
Figure 14:
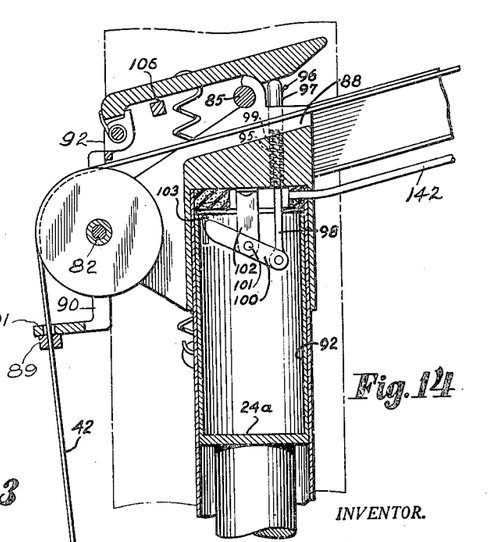
Fig. 14 is a section taken on line 14—14 of Fig. 11.
Figure 19:
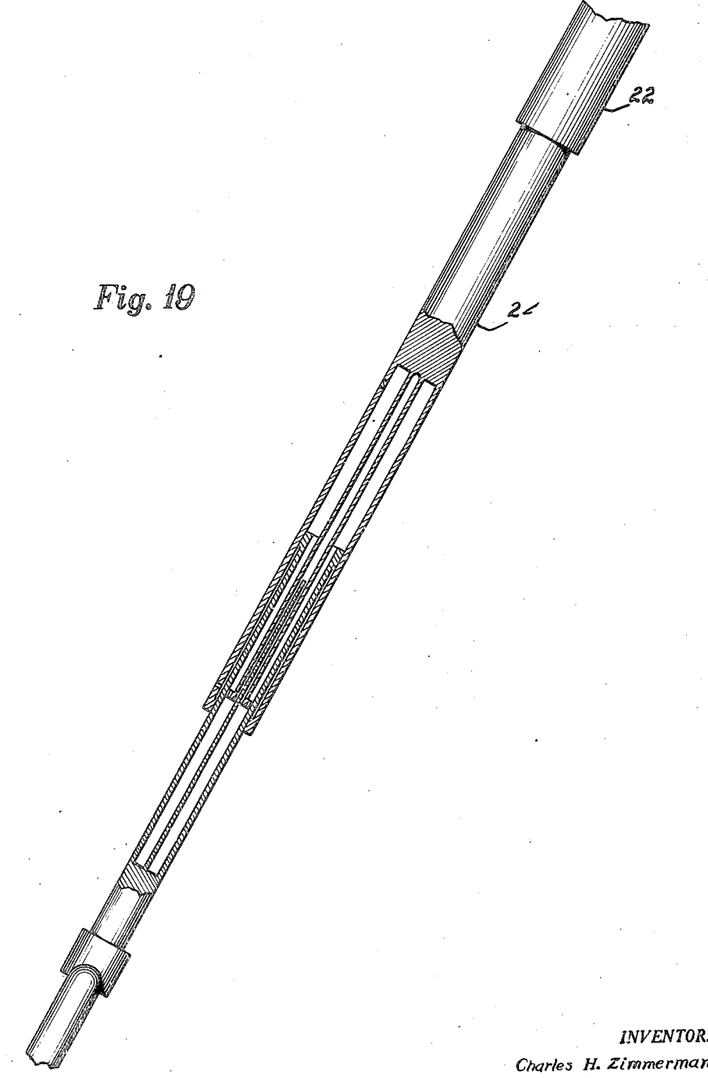
Fig. 19 is a detailed view of an oleo strut.

Mechanism is provided by which the latch 104 is released upon full retraction of the oleo struts into casings 21 and 22 by winding up cables 41 and 42 on the drum 54. This mechanism, as shown in Figs. 12 and 14, includes an abutment 89 fixed to cable 42 and a lever 90 pivoted at 82 and having an angular extremity 91 engageable by abutment 89 to move the lever 90 clockwise about its pivot 82 when the upper end of piston head 24a reaches the upper end of casing 22. Clockwise movement of lever 90 causes the upper end of the latter to engage a depending finger on a latch actuator 92 pivoted at 105 to rotate the actuator counterclockwise. This results in the release of latch 104 by the engagement therewith of an upstanding finger on actuator 92. In Figs. 12 and 14 the abutment 89 is about to effect the release of latch 104.

Figures 4, 7, 8, 16:
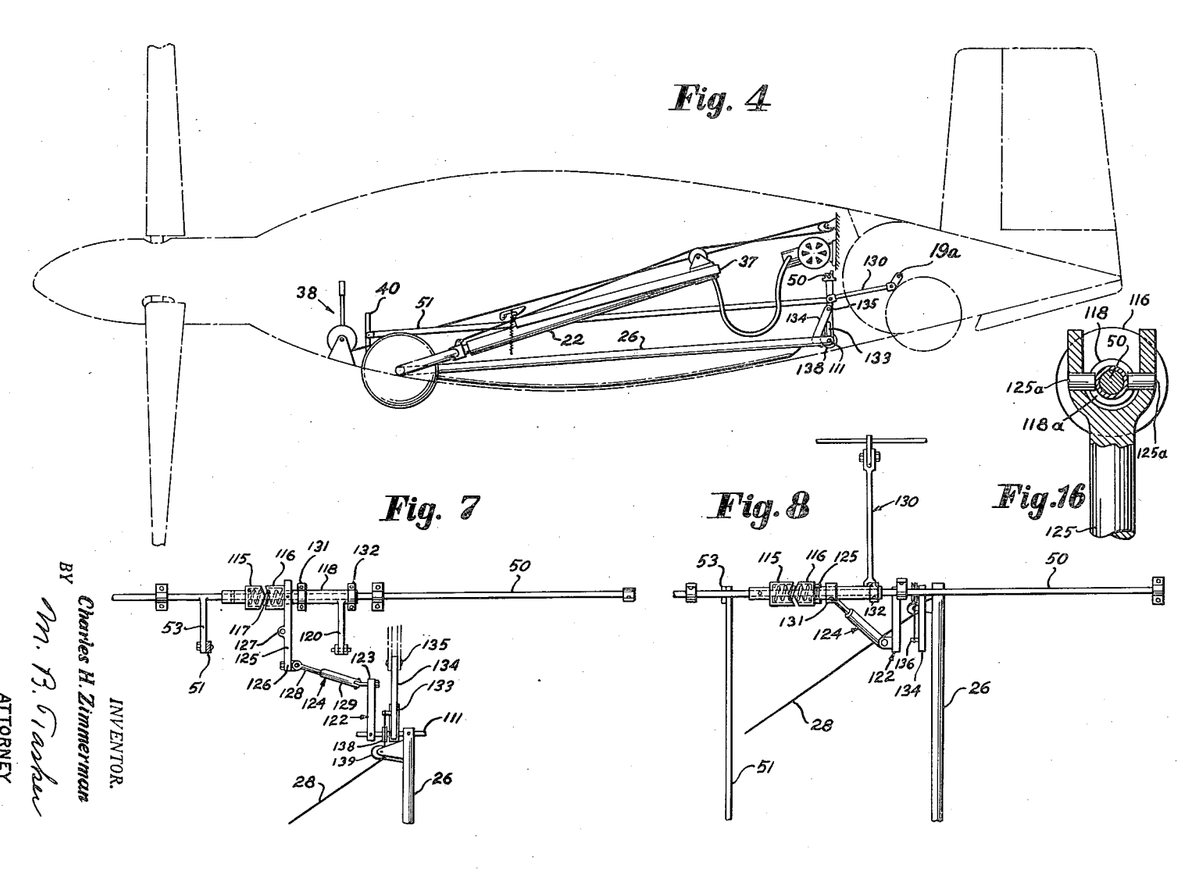
Fig. 4 is a phantom side elevation of the aircraft with the landing gear shown fully retracted as in flight.
Fig. 7 is a section taken on line 7—7 of Fig. 6 showing mechanism controlled by certain movements of the landing gear for connecting the trailing edge flap to the pilot operated control column.
Fig. 8 is a plan view of the mechanism shown in Fig. 7.
Fig. 16 is a sectional detail through the clutch of Fig. 7.

If the pilot wishes to extend his landing gear when in flight from the retracted position in which the rollers 87 are disposed in the extreme right-hand end of channel track 37, shown in Fig. 4, to the position shown in Fig. 6 for "airplane" landing with ground run, in which the rollers are disposed at the extreme left-hand end of the channel track, he merely depresses cap 67 on push rod 64 and pushes handle 58 forward 45°. As previously described, this motion of the handle releases both pawls from the ratchet wheel on drum 54 and allows cables 41 and 44 to run out freely under the weight of the landing gear. As the cable runs out, rollers 87 carrying the casings 21 and 22 with them move forward on the downwardly inclined track 37, motion being constrained by fixed length drag link 26 which rotates about a fixed horizontal axis within the fuselage, the axis about which link 26 rotates being the shaft 111 (Fig. 6) which is journaled on a fixed part of the airplane structure. As casing cap 80 reaches the forwardmost and lowest portion of track 37, hook portion 84 encircles stop pin 85 and is held by gravity against this stop. Also latch 104 engages and depresses plunger 96 to unlock the oleo 24. Oleo 24 is thus permitted to extend slightly. As the indicator needle 112 on actuator indicator 173 reads "airplane" the pilot removes his hand from actuator handle 58 and the cable controlling the descent of the oleo 24 is locked in place at the proper point. In "airplane" position the oleo strut 24 has extended itself from the cylinder 22 only enough to enable the oleo strut to give proper shock absorbing qualities upon landing and to provide in the event of extreme shock in landing for engagement of the upper end of the piston wall 92 on the upper end of the oleo strut with a resilient member in the upper end of the casing 22, herein a sponge rubber pad. The landing gear 20 is locked in place by latch 104 and the craft is prepared to make a landing in conventional fashion as an airplane.

To retract the landing gear after having made a take-off as a conventional airplane the pilot pulls handle 58 on operating mechanism 38 toward him. This motion rotates cable drum 54 clockwise as viewed in Fig. 10 by the driving action of pawl 70 and the holding action of pawl 71, thus retracting the oleo 24 into casing 22. As the oleo becomes fully retracted in the casing, abutment 89 engages lever 90 causing latch 104 to be released. The pilot continues to pull handle 58 on operating mechanism 38 toward him in pump-like fashion thus further retracting cables 41 and 42 and causing rollers 87 carrying the landing gear to move aft along track 37 until the hand 112 on indicator 73 reads "up" in which position the pilot removes his hand from handle 58, thus locking the cable and hence the gear in fully retracted position.

As soon as casing cap 80 has moved up the track 37 sufficiently to move plunger 96 out from under latch 104, this plunger moves upward under the bias of its spring 99, thus rotating lever 100 counterclockwise about point 101 and allowing the free end of lever 100 to pass into slot 103 in piston head wall 92, thus locking the oleo 24 at a time when it must be in fully retracted position. Means which will be described below are also provided for slackening cable braces 28 and 29 upon retraction of the landing gear so these cables will rest just inside the bottom contour of the craft in slots provided for the purpose, as best indicated in Fig. 4.

Experimentation with the type of craft to which the invention is applied has proved that when the craft is very near the ground in true hovering attitude there is encountered at the trailing edge thereof a cushioning effect of the air which manifests itself as an undesirable pitching moment or nose-over tendency.

Figures 5, 17, 18:
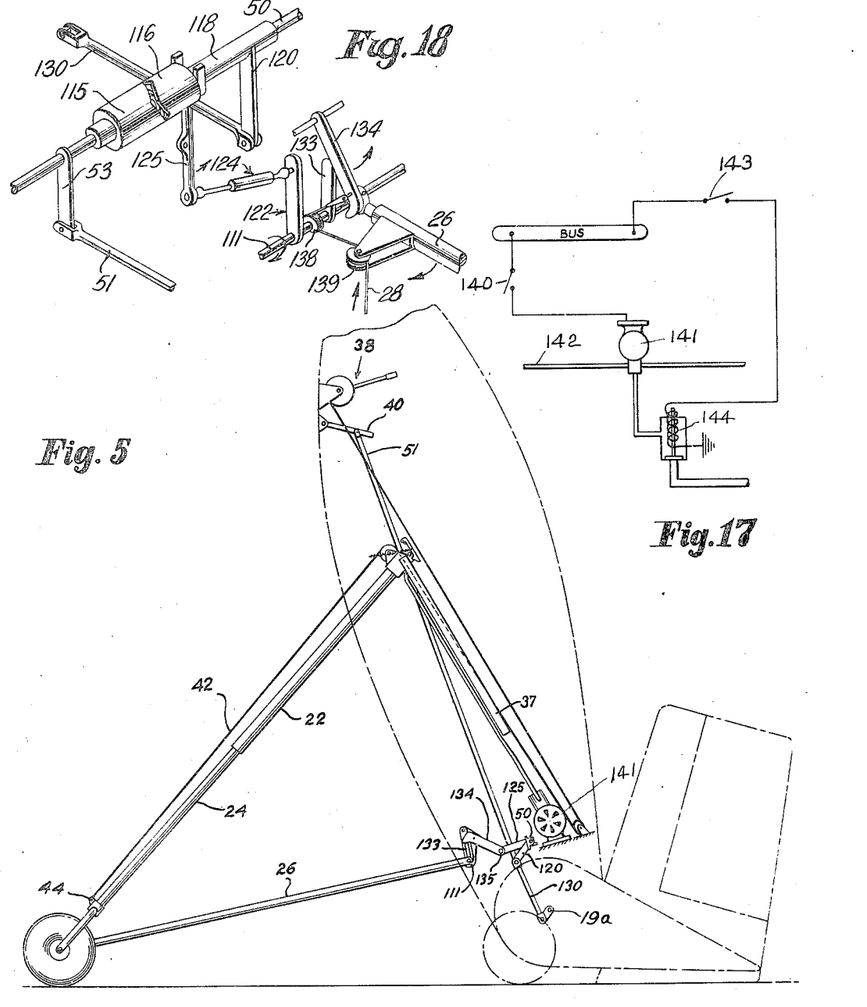
Fig. 5 is a phantom side elevation of the aircraft with the landing gear shown in position for "helicopter" take-off.
Fig. 17 is a diagrammatic showing of one of the control mechanisms for the landing gear.
Fig. 18 is a diagrammatic perspective view of the mechanism of Figs. 7 and 8.

To overcome this condition and permit successful landing and take-off from the true hovering attitude (Figs. 2 and 5) the trailing edge flap 19 and means for controlling said flap are provided. It was found that although this flap could be used for other purposes while in flight, such as for additional longitudinal stability, its important and most useful function is to overcome the pitching moment encountered near the ground at low speeds. In accordance with this invention the flap 19 is freely movable about its pivot 19a and means are provided to control the pivotal movements of the flap from the main control column 40 simultaneously with the horizontal tail surfaces 15 and 16 but only at such time as the landing gear is in fully extended position as it would naturally be when the craft is near the ground in true hovering attitude. When the flap is not engaged by the control mechanism for surfaces 15 and 16 its position is satisfactorily determined by interaction of gravity and airload moments.

The control mechanism for flap 19 is best shown in Figs. 3, 6, 7, 8, and 18. As previously described control shaft 50 for operating surfaces 15 and 16 is rotated from the control column 40 through the rigid connection of shaft 50 to arm 53 which is in turn connected by link 51 to the control column (Fig. 3). A clutch member 115 of generally cylindrical shape is concentrically mounted on shaft 50 and is fixedly pinned thereto and has an annular clutch face concentric with shaft 50. Also mounted to rotate about shaft 50 is a second clutch member 116 having a cooperating face adapted to cooperate with clutch face of member 115 and normally spaced from the latter by a compression spring 117. Clutch member 116 is keyed to sleeve 118, sleeve 118 being concentric with shaft 50 and free to rotate thereabout in bearings 131 and 132. An arm 120 is provided at right angles to sleeve 118 which is pivotally connected to link 130 of the operating linkage for flap 19, and the motion of column 40 is imparted by flap operating linkage 130 to flap 19 whenever clutch member 115 and 116 are engaged.

Engagement of clutch members 115 and 116 is controlled by the landing gear in its final extending movement. To this end drag link 26 is pinned to shaft 111 journaled on a fixed part of the airplane. Shaft 111 also has a rearwardly directed arm 122 fixedly pinned to it and parallel with drag link 26. The free end of arm 122 is universally mounted at 123 to a telescoping member 124 which is universally mounted at its other end to one end of a clutch actuating lever 125 at 126, the opposite end of lever 125 being disposed to actuate clutch member 116 to the left in Fig. 7 once that lever is pivoted in a counterclockwise direction about its fulcrum 127. As shown in Fig. 16 the free end of lever 125 comprises a yoke which straddles sleeve 118 and carries opposed pins 125a that project inwardly into an annular groove 118a in the sleeve. Member 124 is constructed with provision for lost motion in the direction of its length and also has suitable abutment means to enable it to act as a simple drag link when telescoping portion 128 thereof is fully extended from portion 129.

Shaft 111 also carries rigidly pinned thereto cam 133 adapted to engage the free end of a lever 134 pivoted at 135 to which the end of side brace cable 28 is fixed at 136 (Fig. 8). Cable 28 adjacent its point of attachment to lever 134 at 136 passes over a pulley 138 journaled on rod 111 and a second pulley 139 at a suitable angle thereto carried by link 26. The forward portion of lever 134 has a radius to correspond to the motion of cam 133 so that motion of the latter will impart no motion to lever 134 through one portion of angular movement thereof. As clockwise motion of cam 133 continues however lever 134 is permitted to pivot in a counterclockwise direction about 135 from the Fig. 6 position to the Fig. 4 position causing the point of attachment of cable 28 to move toward pulley 138, thus slackening side brace cable 28 in the retracted position of the landing gear shown in Fig. 4.

Having described the construction of the mechanism involved it is now possible to describe the operation of preparing the aircraft for "helicopter" landing in the manner provided by this invention. From a normal cruising position at, for example, 200 M. P. H., to put the craft into a hovering position the pilot pulls the control column 40 toward him and reduces his throttle setting until his speed is greatly reduced. As the pilot continues to pull the control column 40 toward him horizontal control surfaces 15 and 16 move into the position shown in Fig. 2 and the craft assumes a hovering position, the pitch of the propeller blades being properly adjusted by automatic governors. Once in the hovering attitude the pilot must increase his throttle setting in order not to lose altitude as he moves the control column 40 toward neutral position.

If the pilot at this point desires to extend his landing gear in preparation for a "helicopter" landing he depresses push rod 67 on actuator mechanism 38 and pushes handle 58 forward in the manner described above for extending the gear to a position for "airplane" landing. As the plunger 96 on the strut moves under latch 104 the oleo 24 is unlocked. The oleo 24 is now free to extend as cable 42 is released.

As cam 133 is rotated it engages lever 134 causing the latter to rotate upward about point 135 thus tightening side brace cable 28 to its proper taut condition. The pilot continues to hold handle 58 of operating mechanism 38 a quarter turn forward until the needle 112 on indicator 73 shows that the gear is fully extended, oleo 24 having fully extended itself from casing 22 into the position shown in Figs. 2 and 5. To maintain the gear in helicopter position means including an air compressor are provided for supplying air under pressure to casings 21 and 22 to make the casings in effect rigid columns during landing operations. Thus when the pilot has released the gear for movement by gravity to the helicopter position and is preparing to make a landing he closes switch 140 (Fig. 17), which is located in the cockpit, causing air from the compressor 141 to enter casings 21 and 22 through flexible conduit 142. At this point the pilot releases push rod 67 and removes his hand from handle 58 thus locking the operating mechanism 58 in the fully extended position of the gear. As the gear is extended from position of "airplane" landing to "helicopter" landing, drag link 26 is rotated about point 111 and, as described above, imparts proportional angular motion both to cam 133 and link 122. The motion imparted to push-pull rod 124 as the gear descends from fully retracted position to position for "airplane" landing, portion 128 becoming fully extended from portion 129 of member 124, is as described above, lost motion. As the gear extends from "airplane" landing position to "helicopter" position, however, the motion imparted to arm 122 is in turn conveyed to member 124 which, being fully extended, acts as a rigid link and imparts motion to lever 125 at 126 causing lever 125 to rotate on its fulcrum 127 thus in turn causing clutch member 116 to engage cooperating clutch member 115 against the bias of spring 117. Since clutch member 115 is rigidly fixed to horizontal tail surface control shaft 50, it can be seen that any motion imparted to this control shaft by column 40 will also be imparted to sleeve 118 to which clutch member 116 is keyed, and hence via arm 120 depending from sleeve 118 to trailing edge flap control linkage 130. The shape of the jaws on clutch members 115 and 116 is such that, even if the relation between the setting of the horizontal tail surfaces 15 and 16 and the setting of the flap 19 is incorrect prior to their engagement, they will be brought into the correct relative position by the cam action of the jaws during the engaging operation.

Having extended the landing gear and having provided for trim at low speeds near the ground the pilot decreases his power and gently descends in a hovering position toward the ground. As he nears the ground in order to settle thereon the pilot deflects his horizontal tail surfaces and trailing edge flap 19 by actuation of control column 40. This counteracts the cushioning effect of the air which otherwise would cause a nose-over tendency, and the craft is allowed to settle on the ground in the position indicated in Fig. 5.

Since it is a characteristic of the trailing edge flap 19 to offer automatic correction to the tail-up tendency encountered near the ground at low speeds, in certain applications it will prove sufficient to have flap 19 merely a spring-loaded, freely-floating surface rather than having it interconnected with the control for the horizontal tail surfaces 15 and 16. In any case flap 19 is provided on its lower surface with a stop or bumper mechanism 17a and 18a as shown in Fig. 1. The bumper mechanism may, as herein shown, comprise merely a continuation of the vertical tail surfaces below the horizontal surfaces, the extended portions functioning as a stop or ground contact member. In the event the control of flap 19 is not attached to the control linkage of the horizontal tail surfaces, contact of the bumper device with the ground maintains the flap in a fully "up" position in readiness for the next takeoff. In addition to its basic function of providing for trim in hovering or at very low speeds near the ground the trailing edge flap offers several other advantages in that (a) it allows for a reduction in landing gear length; (b) it may be used as a stabilizing flap in the air; (c) it offers a firm foundation for the aircraft on the ground and prevents any possibility of overturning; and (d) it acts as a fairing for the tail wheel.

It is readily apparent that following take-off in a hovering position the pilot operates switch 143 to energize solenoid valve 144 thus bleeding the air within casings 21 and 22. He then retracts his landing gear by rotating handle 58 of operating mechanism 38 thus retracting oleo 24 into cylinder 22 and placing the gear first in position for "airplane" landing and then in the fully retracted position in the manner previously described. It can be seen that as drag link 26 pivots upwardly it imparts motion to cam 133 and arm 122 which act in the reverse manner from that above described thus permitting side brace cables 28 and 29 to slacken and clutch member 116 to disengage itself from clutch member 115 thereby allowing the operating mechanism for tail surfaces 15 and 16 to become free of the trailing edge flap 19.

It will be evident that if the pilot wishes to extend the oleos from the "airplane" position to the "helicopter" position when the aircraft is on the ground, this can be done by closing the switch 140 to supply air to the casings 21, 22. Closing switch 141 will bleed the air in the casings 21, 22 and return the oleos to the position shown in Fig. 6.

It will be evident that as a result of this invention mechanism has been provided enabling low aspect ratio, all-wing aircraft to take off and land in pure hovering attitude as a helicopter, while still retaining the ability to take off and land as a conventional airplane when such a procedure is preferred.

It will also be evident that means has been provided for overcoming the nose-over tendency of an all-wing aircraft as it approaches the ground in a helicopter landing.

While a suitable mechanical embodiment of the invention has been hereinabove described and illustrated in the accompanying drawings for the purpose of disclosing the same, it is to be understood that the invention is not limited to the particular arrangement so illustrated and described, but many changes in the arrangement of the various parts may be resorted to, and that the invention may be applied to a variety of aircraft types without exceeding its scope as defined in the claims appended hereto.

Having now described the invention so that others skilled in the art may clearly understand the same, what is desired to secure by Letters Patent is as follows:

1. An aircraft capable of both horizontal and vertical flight including a supporting structure, means for positioning said craft for horizontal take-off including landing gear and a tail support, said landing gear including casings pivotally connected to said structure at their upper ends and struts telescoping into said casings and carrying landing wheels at their free ends, means operable when said casings and struts are telescoped for retracting said landing gear into said supporting structure, means operable when said casings are extended for extending said struts relative to said casings to move said wheels beyond the horizontal take-off position thereof for positioning said craft for vertical take-off, and means for locking said casings against retraction except when said struts are fully retracted into said casings.

2. An aircraft capable of both horizontal and vertical flight including a supporting structure, means for positioning said craft for horizontal take-off including landing gear and a tail support, said landing gear comprising casings pivotally supported on said structure at their upper ends and oleo units telescoping into said casings and carrying landing wheels at their free ends, means for positioning said craft for vertical take-off including means for extending said casings and for extending said oleo units relative to said casings, means controlled by the pilot for first retracting said oleo units and subsequently retracting said casings, means for releasably holding said casings in extended position, and means controlled by said oleo units upon full retraction thereof for releasing said holding means.

3. An aircraft capable of both horizontal and vertical flight including a supporting structure, means for positioning said structure for either horizontal or vertical take-off including landing gear and a tail support, said landing gear including telescoping casings and oleo units, said casings having pivots at their upper ends movable along tracks disposed generally longitudinally of said craft and said oleo units carrying landing wheels at their free ends, means at the forward end of said tracks for limiting movement of said casings along said tracks, means for latching said casings in said forward position, means for extending said oleo units from said casings to position said craft for vertical take-off, means for first retracting said oleo units and subsequently retracting said casings into said supporting structure during which latter movement said pivots move rearwardly along said tracks, and means controlled by said oleo units for releasing said latching means in the fully retracted position of said units.

4. An aircraft capable of both horizontal and vertical flight including a supporting structure, means for positioning said craft for either horizontal or vertical take-off and landing, including tail supporting means fixed to the structure and landing gear also carried by said structure forward of said tail supporting means, said landing gear having extensible casing and strut elements and being retractable within said supporting structure when said elements are collapsed, a pivoted tail flap, horizontal control surfaces, pilot operated means for operating said surfaces, means controlling the extension of said casing elements from said supporting structure and the extension of said strut elements from said casing, and means governed by the extending movement of said strut elements for connecting said flap and said horizontal control surfaces for simultaneous operation by said operating means.

5. An aircraft capable of both horizontal and vertical flight including a supporting structure, means for positioning said aircraft on the ground for horizontal or vertical take-off comprising track means extended longitudinally of said structure, landing gear retractible into said structure comprising casings and struts extensible therefrom including relatively stationary and movable elements, said casings having their upper ends slidable along said track means, and pilot controlled operating mechanism for retracting the elements of said struts into said casings and said landing gear into said structure in the order named.

6. An aircraft capable of both horizontal and vertical flight including a supporting structure, retractible landing gear including casings which are extensible from said structure and struts which are extensible from said casings in the extended position of said casings, latch means for holding said casings releasably in extended position, and latch releasing means controlled by the movable element of said extensible struts as the latter move into fully retracted position in said casings.

7. An aircraft capable of both horizontal and vertical flight including a supporting structure, means for positioning the craft for horizontal take-off including landing gear having casings movable from a retracted position within said supporting structure to an extended position, means for positioning said craft for vertical take-off when said casings are extended including extensible oleo struts, means responsive to initial extending movement of said oleo struts, for locking said casings in extended position and for releasing the latter as said struts move to fully retracted position in said casings.

8. An aircraft capable of both horizontal and vertical flight including a supporting structure, retractable landing gear including casings extensible from said structure and struts which are extensible from said casings in the extended position of the latter, means for locking said struts to said casings, and means responsive to movements of said casings into and out of their fully extended position for unlocking and locking said struts.

9. An aircraft capable of both horizontal and vertical flight including a supporting structure, landing gear movable between an extended position and a retracted position within said structure, said landing gear including diagonal cable braces, and cam means responsive to movements of said landing gear for slackening said cable braces as said gear moves into retracted position and for tightening the same as said gear is extended.

10. An all-wing aircraft capable of both horizontal and vertical flight including laterally extended horizontal tail surfaces having operating mechanism, a rearwardly extended tail flap having operating mechanism, retractable landing gear including casing members extensible to permit horizontal take-off and landing, said landing gear also including struts which are extensible from said casing members when the latter are extended to position said craft for vertical landing and take-off, and means responsive to extension of said struts for operatively connecting said flap operating mechanism to the operating mechanism for said horizontal surfaces.

11. An all-wing aircraft capable of both horizontal and vertical flight including a supporting structure, landing gear fixed to said structure, a tail wheel fixed to said structure aft of said landing gear, said landing gear having extensible struts for positioning said craft for horizontal take-off and landing in their retracted position and for positioning said craft for vertical take-off and landing in their extended position, and a tail flap pivotally supported on said structure which is movable to counteract a nose-down tendency of the craft during vertical landing and which forms a fairing for said tail wheel in normal flight position of said tail flap.

12. An all-wing aircraft capable of both horizontal and vertical flight including a supporting structure, landing gear for positioning said craft at different attitudes for horizontal and vertical take-off and landing, a tail flap pivotally mounted on said structure normally disposed in substantially longitudinal alignment with said wing during flight and movable into an angular position relative to said wing when the latter is on the ground in position for vertical flight, said flap having longitudinal ground engaging members on its bottom surface.

13. An aircraft capable of both horizontal and vertical flight including a supporting structure, means for positioning said craft for either horizontal or vertical take-off including landing gear and a tail support, said landing gear comprising casing elements and movable oleo units, said casing elements having pivots at their upper ends movable along downwardly and forwardly sloping tracks carried by said supporting structure and said oleo units supporting landing wheels at their free ends, stop means for limiting the forward movement of said pivots along said tracks, latch means carried by said supporting structure for releasably holding said pivots in their forward position, latch releasing means carried by said oleo units for releasing said latches as said oleo units move into fully retracted position in said casing elements, means for locking said oleo units in their retracted position, lock releasing means carried by said oleo units for controlling said locking means, and means for operating said lock releasing means to unlock said oleo units as said pivots move toward said stop means.

14. An all-wing aircraft capable of both horizontal and vertical flight including landing gear for positioning said aircraft at different attitudes for horizontal and vertical take-off and landing, a normally free floating trailing edge flap pivoted on said wing, and means for positively moving said flap above its neutral position as the aircraft approaches the ground in vertical landing.

15. An aircraft capable of both horizontal and vertical flight including a main sustaining surface, extensible and retractible landing gear for positioning said aircraft at different attitudes for horizontal and vertical take-off and landing, a normally free floating trailing edge flap pivoted on said main surface, means for controlling said flap during vertical landing, and means responsive to the extension of said landing gear preparatory to a vertical landing for governing said flap controlling means.

16. In an all-wing aircraft capable of both horizontal and vertical flight, control surfaces for longitudinal control of said aircraft, a pilot operated member for controlling said surfaces, landing gear for positioning said aircraft at different attitudes for horizontal and vertical take-off and landing, means for projecting said landing gear from a retracted position in said wing into a first projected position in which the aircraft is in position for horizontal take-off, and means for further projecting said landing gear into a second projected position in which the aircraft is in position for vertical take-off, a tail flap pivotally mounted on said wing and normally free from pilot control, and means controlled by the movement of said landing gear into said second projected position for connecting said flap to said pilot operated member.

CHARLES H. ZIMMERMAN.

REFERENCES CITED

The following references are of record in the file of this patent:

UNITED STATES PATENTS

| Number | Name | Date |
|---|---|---|
| 1,485,780 | Fales | Mar. 4, 1924 |
| 1,608,763 | Barling | Nov. 30, 1926 |
| 1,786,545 | Noeggerath | Dec. 30, 1930 |
| 1,853,232 | Schwarz | Apr. 12, 1932 |
| 2,106,289 | Wallace | Jan. 25, 1938 |
| 2,360,988 | Thomas | Oct. 24, 1944 |

FOREIGN PATENTS

| Number | Country | Date |
|---|---|---|
| 438,296 | Great Britain | Nov. 14, 1935 |
| 468,063 | Great Britain | June 23, 1937 |
| 505,263 | Great Britain | May 4, 1939 |
| 767,748 | France | May 7, 1934 |